United States Patent Office 2,794,310
Patented June 4, 1957

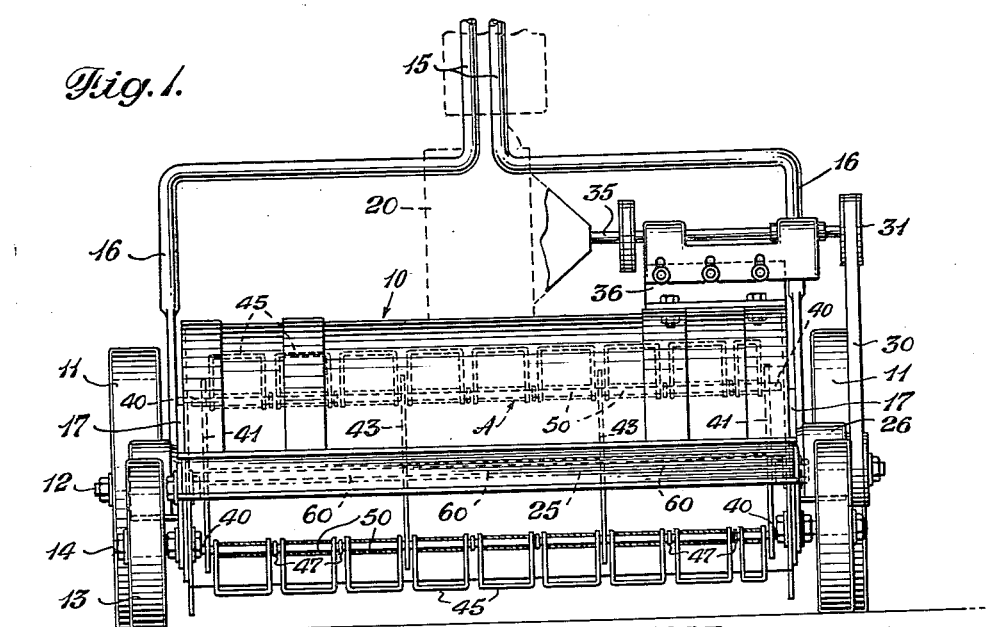
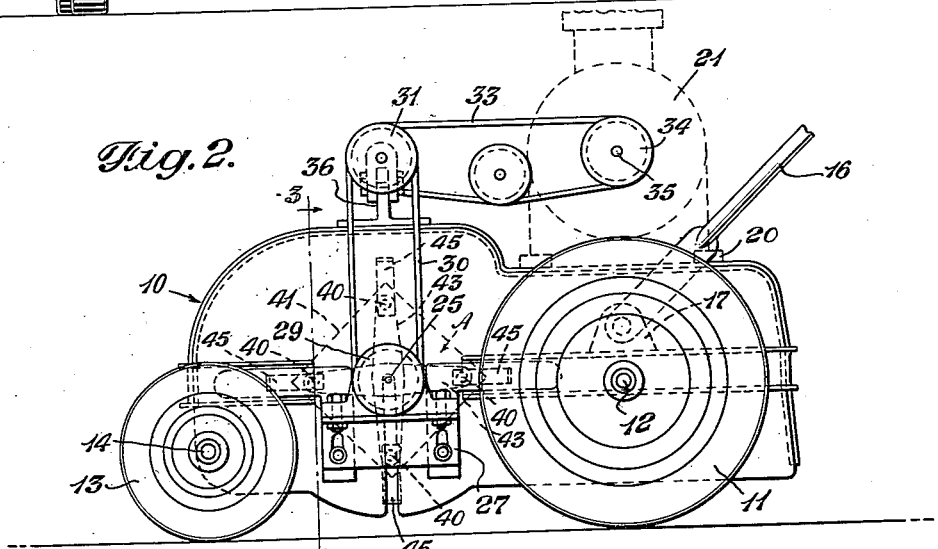
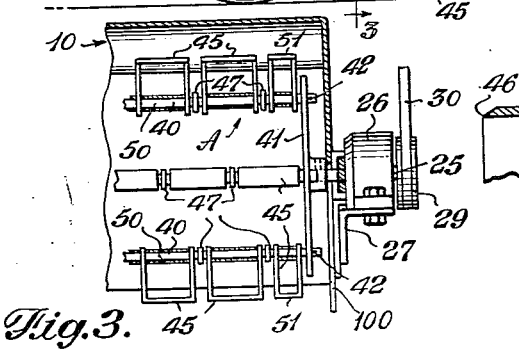

2,794,310

CUTTING REEL FOR LAWN MOWER

Russell Baker Galloway, Mississippi City, Miss.

Application August 28, 1953, Serial No. 377,102

6 Claims. (Cl. 56—294)

The invention relates to reel type lawn mowers in which a cutter bar is omitted, and more particularly to a lawn mower of this type wherein the reel includes a number of knives or cutting blades, and a plurality of cutter shafts, each blade being adapted to individually revolve on a cutter shaft, the cutter shafts being located in the approximate position of the cutting edges of standard lawn mowers. The knives or blades are held in cutting position by centrifugal force, but because they revolve freely permit the knives to pass over stones or obstructions without injury to the cutting edge and without throwing such obstructions out from the machine.

My improved mower is primarily designed to cut lawn grass or weeds, and includes a form of reel which to my knowledge has never been used in connection with lawn mowers, although devices operating along somewhat similar principles have been used in other connections, as for example for feed grinding, beet topping, potato topping, and the like.

Among the characteristic features of my improved lawn mower may be mentioned the following:

1. The knives of the mower reel are held in outward position by centrifugal force which forms a parallel cutting surface and provides a level cut.

2. The knives are not fixed and will absorb the shock of hitting stones, roots, etc., which protects the knives and engine.

3. The knives will not throw foreign objects such as stones, etc., with any great force, since they are flexible.

4. The knives act independently of each other and can be individually replaced if damaged.

5. The knives can revolve in a manner similar to the solar system: that is, they revolve about a central axis and can also revolve about their own axis if they encounter resistance.

6. The knives cut by centrifugal force, which shears grasses and weeds.

7. The knives will cut in forward or reverse.

8. The knives help propel the mower in forward motion by friction in the cutting process.

The primary purpose of the invention is to cut lawn grass around the average home, and to do so with safety and economy. In addition, the result of the cutting must be completely acceptable to the average home owner. The present lawn mower was devised with a series of flat cutting surfaces which, while flexible to absorb shock, are capable of cutting a smooth and level surface. This is the main object of the invention—to cut the blades of grass at the same height and at any distance from the ground that one would ordinarily desire for a lawn.

In my improved device the blades are parallel with the ground, and are held in position only by centrifugal force and therefore have complete give or flexibility upon contact with a foreign object, provide complete coverage of the entire width of the reel for each mower blade, and operate entirely independently for the reason that no overlapping of blades is necessary in order to get complete cutting of all grass over which the mower passes. Each set of blades cuts the full width of the reel and may therefore be operated at considerably lower speeds than those devices which depend on an overlapping of oppositely arranged blades, as in the Henderson device.

My improved reel has a series of shaped knives with all the cutting surfaces parallel to the ground or lawn. The knives are held out by the centrifugal force due to the rotary action of the cutter shaft. This action provides a smooth and level cut, which is the object of cutting the grass. The shaped knives are separated from each other by spacers or washers so the action of one knife hitting an object will not be transferred to the adjacent knife. The next advancing blade is so arranged that it will cut the space left vacant by the gap left due to the spacer. The shaped knives are so arranged that they cannot hit another knife even if they all rotate about the cutter shaft at the same time. This is the part of the construction that follows the Ferris wheel and is an exclusive feature of this device.

My improved mower is designed to cut grass short and horizontally, which is primarily the object of a lawn mower.

The present device will cut tall grass efficiently, and will also cut short grass, and as previously pointed out is primarily a lawn mower.

My improved reel is preferably provided with four rows of small cutters to provide economical construction and replacement. The mechanical details are simple, which is another advantage of this invention.

The reel of my improved mower may be housed in a manner similar to the average reel type home lawn power mower. The main shaft is supported at the ends by bearings and driven from a pulley fixed to the end of the shaft by a belt and pulley arrangement to a small gas engine. The reel has a housing over the top and sides.

Another feature of this reel is that it does not throw objects or grass from the rear at high speed. The cutting surface, being horizontal, holds a small portion of the grass cut until it is displaced the next time it goes around. This prevents accidents and is a very desirable feature.

The shaped knives, while light and flexible, have sufficient weight, so that such high speeds as described in one of the other inventions are not necessary. A speed of 2000 R. P. M. will be sufficient for most lawns.

The invention will be more readily understood by reference to the accompanying drawings and the following detailed description in which are set forth by way of illustration rather than by way of limitation a specific embodiment of my invention.

In the drawings:

Fig. 1 is a front view of a lawn mower embodying my invention;

Fig. 2 is a side view of the same;

Fig. 3 is a section on line 3—3 of Fig. 2 with parts broken away; and

Fig. 4 is a detail showing the sharpened edge of one of the cutter blades.

Referring to the drawings in detail, reference numeral 10 denotes a housing or body for the lawn mower which is open at the bottom and, as shown, is provided with a pair of rear wheels 11, 11 supported on shafts 12, 12 carried by the housing, and a pair of front wheels 13, 13 supported on shafts 14, 14 carried by the housing. The lawn mower is equipped with the usual handle 15 shown as provided with side arms 16, 16 hingedly engaging brackets 17 carried by the frame portion of the body member 10.

At a suitable location on top of the housing there is provided a motor base 20 carrying a power plant or motor 21, which may be a gasoline engine as shown, or an electric motor. As shown, the power plant is designed to drive the cutter reel, leaving the motor itself to be pushed by hand.

A cutter reel constituting an important feature of my invention is designated generally by the reference letter A and, as shown, is mounted on the forward part of the housing or body 10 and is provided with a center shaft 25 on which the other parts of the reel are mounted. The shaft 25 is adapted to be rotated from the prime mover or motor 21 and is rotatable in end bearings 26 carried by brackets 27 adjustably mounted in the ends of the body or housing 10 which is suitably slotted as at 100 to receive the cutter shaft 25. As shown, a pulley 29 is mounted on an extension of the shaft 25 and is driven by belt 30 from a pulley 31, which pulley in turn is driven by belt 33 from a pulley 34 mounted on the shaft 35 of the motor 21. The pulley 31 is mounted on suitable bracket 36 on the top of the housing 10. As shown, the cutter reel A includes in addition to the center shaft 25 a series of rigidly disposed cutter carrying shafts 40 preferably formed of rolled steel, and herein shown as four in number. The ends of the shafts 40 extend through side plates 41, 41 carried by the center shaft 25 and may be threaded beyond the side plates 40 to receive nuts or other fastening means 42. Intermediate their ends the cutter shafts 40 are supported at suitable intervals by cutter shaft supports 43.

Upon the cutter shafts 40 are rotatably mounted a series of independent U-shaped cutters 45. The cutters may be formed of strong steel and are provided with sharpened cutting edges 46 which may be freely rotated through an angle of 360° without striking any part of the machine. As shown, the cutters 45 may be separated at their ends by washers 47 or by supporting arms 43. Spacing rollers 50 may be provided between the two arms of the individual U-shaped cutters and somewhat similar but larger spacing rollers 60 may be provided on the center shaft between successive supporting arms 43 carried thereby. A cutter 51 of half the width of the other cutter knives 45 is preferably provided at the end of every alternate cutter shaft so that the cutters will be staggered, and the small space between adjacent cutters on one shaft, due to the presence of spacing washers 47, will be cut by the cutters on the next shaft.

The invention has been described in detail for the purpose of illustration but it will be obvious that numerous modifications and variations may be resorted to without departing from the spirit of the invention.

I claim:

1. A lawn mower cutting reel consisting of a series of cutters independently, freely and swingingly mounted on cutter shafts spaced around a central main shaft with the cutting edge parallel to the main shaft so as to cut a horizontal path through short and tall lawn grasses when the main shaft is rotated, causing the cutters to stand out and assume the normal cutting position, the distance between the cutter shafts and the central main shaft being greater than the distance between the cutting edges of the cutters and the cutter shafts on which the cutters are mounted, thereby permitting rotation of each cutter about its shaft through a 360° angle without striking any part of the machine.

2. A lawn mower cutting reel with a series of cutters independently, freely and swingingly mounted on cutter shafts symmetrically disposed about a central shaft, which are not in contact with each other and yet are free to rotate about the main shaft and cutter shaft and yet not able to contact or interfere with any other no matter what position is assumed or created by the cutter hitting a foreign object, the distance between the cutter shafts and the central main shaft being greater than the distance between the cutting edges of the cutters and the cutter shafts on which the cutters are mounted, thereby permitting rotation of each cutter about its shaft through a 360° angle without striking any part of the machine.

3. In a lawn mower, a non-cutter bar type horizontally rotating reel with individually hung U-shaped cutters swingingly mounted on cutter shafts symmetrically disposed about a central main shaft with the closed end sharpened to form the cutting edge and the cutters so spaced, with all cutting edges parallel to the main shaft, that the assembly forms a series of horizontal cutting bars with any small portion of any bar so hinged as to give way to excessive resistance encountered when any part of the blade strikes a stick or other foreign object, the distance between the cutter shafts and the central main shaft being greater than the distance between the cutting edges of the cutters and the cutter shafts on which the cutters are mounted, thereby permitting rotation of each cutter about its shaft through a 360° angle without striking any part of the machine.

4. A non-cutter bar type lawn mower cutting reel consisting of cutter shafts radially disposed about a horizontal rotating central shaft with the cutter shafts having a plurality of U-shaped cutters swingingly mounted and the cutter shafts located at a greater distance from the central shaft than the length of the cutter, so that the cutters are free to rotate a full 360° around the cutter shaft without contact with the central shaft or any other part.

5. A lawn mower cutting reel comprising a central horizontal rotatable shaft, rigid cutter shaft supports carried by said central shaft and rotatable therewith, a series of cutter shafts carried in symmetrical arrangement by said supports, and a series of cutters swingingly mounted on each of said cutter shafts, each cutter of the series being independently swingable through a 360° cycle about its particular shaft.

6. A lawn mower cutting reel comprising a rotatable horizontal central shaft, a series of horizontal cutter shafts symmetrically disposed about the central shaft and rotatable therewith, and a series of cutters swingingly mounted on each of said cutter shafts, each cutter including a cutter edge parallel at all times to the shaft on which its cutter is mounted, the distance between the central shaft and the cutting shafts being greater than the distance between the cutting edges of the cutters and the cutter shafts in which the cutters are mounted, so that on striking an abutment any cutter is free to rotate 360° about its cutter shaft without striking any other part of the cutter reel, the cutting edges of the series of cutters on each cutter shaft normally forming a substantially continuous horizontal cutting bar.

References Cited in the file of this patent

UNITED STATES PATENTS

| | | |
|---|---|---|
| Re. 14,886 | Campbell | June 22, 1920 |
| 452,544 | Ish | May 19, 1891 |
| 1,034,392 | Miller | July 30, 1912 |
| 1,846,459 | Romera | Feb. 23, 1932 |
| 2,104,343 | Fish | Jan. 4, 1938 |
| 2,667,022 | Richey | Jan. 26, 1954 |
| 2,669,819 | Sawyer | Feb. 23, 1954 |